Nov. 29, 1960   J. J. DELISO   2,962,066
AUGER HAVING REPLACEABLE CUTTERS
Original Filed Feb. 14, 1958

INVENTOR.
JOHN J. DELISO
BY Charles R. Fay, atty.

United States Patent Office 2,962,066
Patented Nov. 29, 1960

---

2,962,066

AUGER HAVING REPLACEABLE CUTTERS

John J. Deliso, 475 Shrewsbury St., Worcester, Mass.

Original application Feb. 14, 1958, Ser. No. 715,278. Divided and this application Jan. 7, 1959, Ser. No. 785,426

1 Claim (Cl. 145—126)

This application is a division of my prior application Serial No. 715,278 filed by me February 14, 1958.

This invention relates to a new and improved auger, and the principal object of the invention resides in the provision of an auger which may be made very inexpensively particularly as to sets of cutters of different size, by providing a shank having a lead or cutting point integral therewith, and a selectively applicable set of disc-like cutters of varied sizes, these cutters being individually applied to the shank for boring holes of different sizes, and combined with means for securing the disc-like cutters in position with respect to said cutting point, whereby a single shank serves to provide, with the different disc-like cutters, a series of augers of varying diameters for boring holes according to the diameters of the cutter.

Other objects of the invention include the provision of an auger as described comprising a shank and an enlarged conical, cutting point at one end thereof, said point being provided with a base or shoulder against which the different disc-like cutters may be positioned, there being a non-circular driving portion on the shank adjacent the base of the pointed end and each cutter having a complementary, non-circular aperture generally centrally thereof for reception on said driving portion, so that the cutters are driven as the shank is driven, the various discs being provided with generally radial slots and a sharp cutting edge for each slot, the material cut passing through these slots from the cutting side of the disc to the shank side thereof, so that the tool is self-clearing.

A further object of the invention resides in the provision of a series of discs, each of which is provided with cutting edges at one side surface only, said discs being of different diameters for boring holes of different sizes and each disc having a non-circular aperture therein, the apertures in each of the discs being of the same size for separate application to a single shank having a complementary non-circular driving portion.

Other objects and advantages of the invention will appear hereinafter.

Reference is to be had to the accompanying drawings, in which

Figure 1:
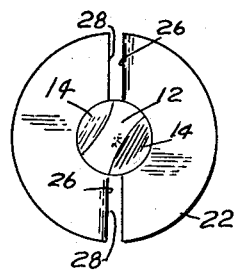
Fig. 1 is a view in end elevation of an auger according to the present invention.

In carrying out the present invention, there is provided a shank or spindle 10 for application to a power tool or to which may be applied a handle of any kind. The shank or spindle may be of any size or length, and it is preferable that two of these shanks, of different lengths, be supplied in a set to accomplish substantially all boring operations ordinarily encountered as for instance in forming holes up to two inches in diameter.

The shank or spindle 10 is provided with an enlarged end preferably in the form of a conical point 12, this point being enlarged relative to the shank and ground as indicated generally at 14 to provide for cutting as the spindle is rotated. The conical end 12 has a generally circular base at 16 adjacent to which there is provided a non-circular portion 18, which in this case is shown as square. It will be observed in Fig. 4 that portions of the base 16 of the conical end 12 extend beyond the limits of the non-circular portion 18, thus providing a shoulder or series of shoulders located circumferentially.

Figure 4:
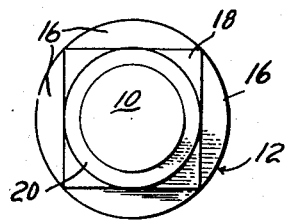
Fig. 4 is a view on an enlarged scale, looking in the direction of arrow 4 in Fig. 3.

Inwardly of the non-circular portion 18, there is provided a relatively enlarged screw-threaded cylindrical portion 20, and this may be of any general diameter desired but cannot be of a diameter any larger than the length of a side of the square 18; it will be observed in Fig. 4 that all parts of the screw-threaded portion 20 are located within the non-circular area 18, and this is true regardless of the number of sides of part 18.

Figure 5:
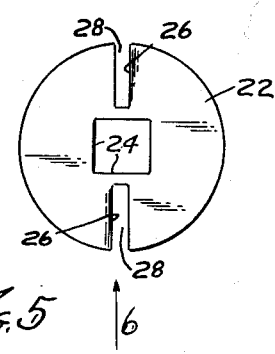
Fig. 5 is a view in front elevation of a cutting disc.
Figure 6:
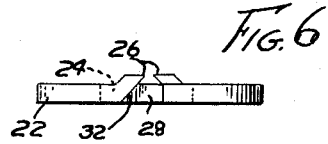
Fig. 6 is an edge view thereof, looking in the direction of arrow 6 in Fig. 5.

As shown in Figs. 5 and 6, there are provided a series of disc-like cutters of different diameters. Each cutter is preferably circular and these cutters have been indicated by the same reference numeral 22 throughout for clarity of illustration. Each disc is provided with a central aperture 24 which is complementary to the non-circular portion 18, and in this case the apertures 24 are square to conform to the square shape of the non-circular portion 18 shown in Fig. 4.

Each disc-like cutter 22 is provided with a series of cutting edges which are formed in the material of the discs to extend laterally outwardly at one face or side surface thereof only, and these cutting edges are indicated by the reference numeral 26. There may be as many of these cutting edges as desired, and they extend inwardly a distance short of the area of the aperture 24 as shown in Fig. 5. There is a slot 28 in advance of each cutting edge 26.

Figure 2:
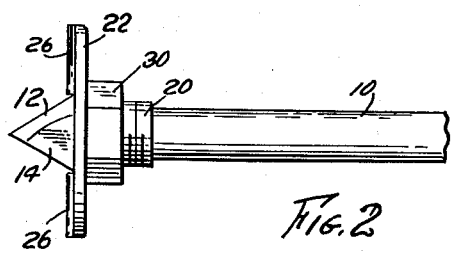
Fig. 2 is a view in side elevation thereof.
Figure 3:
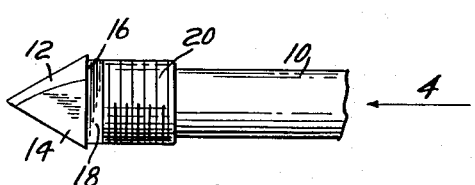
Fig. 3 is a view in side elevation showing the shank with the cutting disc omitted.

Having determined the size of a hole to be bored, a cutting disc of corresponding diameter is chosen and slipped over the small end of the shank or spindle 10, over the threads 20, and then over the non-circular portion 18, so that in effect the disc-like cutter 22 becomes rotationally fixed relative to the shank 10. The cutting edges 26 are of course positioned so as to extend in the same direction as the point 12, see Fig. 2.

A nut 30 is then slid over the shank and onto the screw threads 20 and tightened up to clamp the disc-like cutter against the base 16 of the conical point 12, and the device is now ready to be placed in the chuck of a drill or other tool, or a handle may be used for manual operation.

This auger will be seen to bore a hole down to the size of the diameter of the base of the cone 12. It is a very inexpensive tool to make inasmuch as no parts of it need be particularly hardened except for the cutter discs. These discs are also very inexpensive to manufacture, as by stamping, and may be disposed of and new sets purchased at very reasonable cost, so that it will be seen that a set of one or two spindels 10 and a set of several discs may be made and sold to the public very reasonably.

This tool has been found to operate very efficiently and it clears its own hole as the detritus is forced up through the slots 28, the chips rising just in front of the cutting edges 26 and sliding inwardly along the inclined edges 32 adjacent to the cutting edges. Even the material cut by the cone 12 finds its way through these slots and this is due in part to the fact that the end 12 is in general conical form, and tends to move the material out by it outwardly toward the slots.

Figure 7:
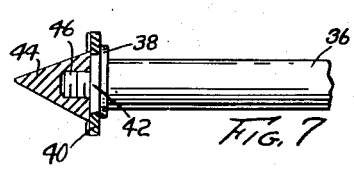
Fig. 7 is a view in elevation partly in section showing a modification.

Fig. 7 shows a modification wherein the spindle 36 is provided with a lateral abutment 38 of any shape against which the cutter disc 40, similar to that at 22, is positioned. The cutter 40 is of course on the square portion 42, for rotation with the spindle, and the cone or lead cutter 44 is detachably mounted on a threaded tip 46 on the end of the spindle. The base of the cone holds the cutter disc to the abutment 38.

Having thus described my invention and the advantages thereof, I do not wish to be limited to the details herein disclosed, otherwise than as set forth in the claim, but what I claim is:

An auger comprising a cylindrical shank of uniform section, a reduced, axially arranged threaded extension adjacent one end thereof and fixed thereto, a non-circular integral portion on the shank located between the threaded extension and the shank at said one end, said non-circular portion being flat, relatively thin, at a right angle to the axis of the shank, and greater in diameter than the shank, an integral flange on the shank in intimate contact with the non-circular portion and being commensurate therewith in thickness, said flange being flat, parallel to the non-circular portion, and having a diameter greater than the shank and the non-circular portion, a separate conical cutting member having a threaded recess therein in the base thereof engageable with the threaded extension, a separate, attachable and removable cutter disc, said disc being flat and circular, a pair of parallel cutting edges protruding from one side surface of the disc in a generally radial direction, the cutter disc having a thickness commensurate with that of the non-circular portion and being provided with a central non-circular aperture receiving said non-circular portion with the cutter disc flatly and detachably held against the flange in parallelism therewith by the conical member, said disc having a diameter greater than that of the flange and the cutting edges extending only between the base of the conical member and the peripheral edge of the cutter disc, the cutting edges extending radially from the edge of the base of the conical member to the edge of the disc.

References Cited in the file of this patent

UNITED STATES PATENTS

| | | |
|---|---|---|
| 961,770 | Grandperrin | June 21, 1910 |
| 1,065,294 | Collins | June 17, 1913 |
| 1,643,679 | Roderick | Sept. 27, 1927 |
| 2,577,987 | Wilson | Dec. 11, 1951 |

FOREIGN PATENTS

| | | |
|---|---|---|
| 246,041 | Great Britain | Jan. 21, 1926 |